Aug. 10, 1937.   J. G. STEEL   2,089,672
LIGHTING OF ROAD VEHICLES
Filed Aug. 19, 1936   2 Sheets-Sheet 1

Inventor:-
John Gibson Steel
By his Attorney:- Walter Turns

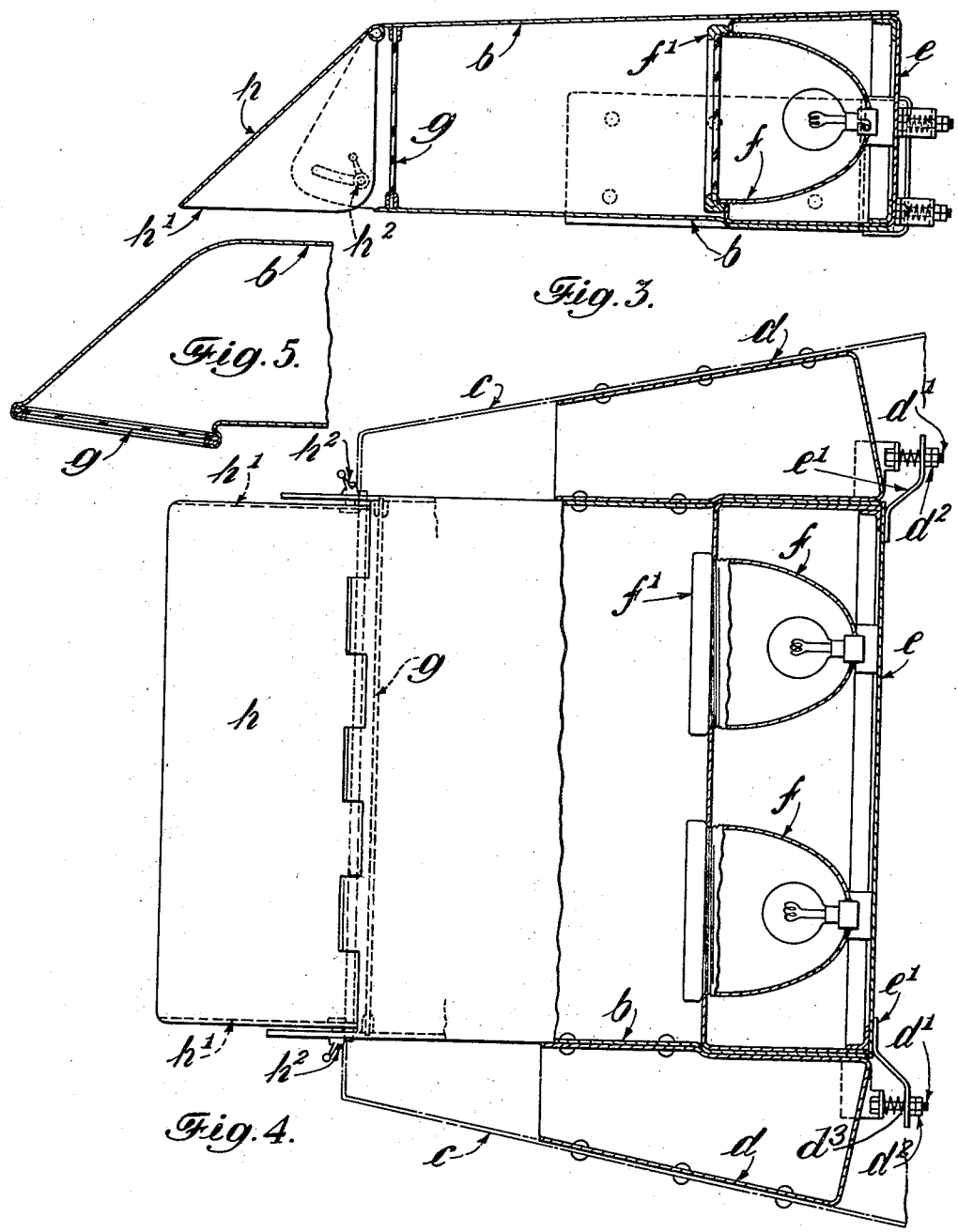

Patented Aug. 10, 1937

2,089,672

UNITED STATES PATENT OFFICE 2,089,672

LIGHTING OF ROAD VEHICLES

John Gibson Steel, Hulme, Manchester, England

Application August 19, 1936, Serial No. 96,731
In Great Britain August 24, 1935

1 Claim. (Cl. 240—8.11)

This invention relates to the lighting of road vehicles, and particularly motor road vehicles which are usually provided with powerful headlamps.

The object of the invention is to provide a means of lighting which, whilst providing adequate safe illumination of the road for a driver, will be incapable of dazzling a driver or pedestrian facing the vehicle.

According to the invention the headlamps of the vehicle are arranged behind a cowl or shield so that they are not visible to an oncoming driver or pedestrian (in normal driving or walking positions), and the said cowl or shield is positioned at a distance from the lamp at a level, such that light may be thrown below it on to the road far enough ahead to permit safe driving.

Preferably, the lamps are placed at the rear of a housing or box, with light-reflecting walls, the cowl or shield constituting the front of the box, and the light from the lamps finding its exit through an opening in the floor of the box at the forward end. The inner face of the cowl is made reflective, the result being that a reflected or diffused light is thrown on to the roadway.

The cowl or shield may be adjustable to various angles, and may also be adapted for removal from before the lamps when no danger of dazzle is present.

Usually, the housing will be built in below the bonnet of the car, above or through the radiator (if at the front) and may either project outwards from the bonnet at the front end, or be completely below the bonnet. The invention finds special adaptation to cars having so-called streamlined fronts.

The improved lighting means will be supplemented by the usual side lamps and by any other auxiliary lamps required, and may also be augmented by a pair of headlamps in the usual positions for use at times and in places where there is no risk of dazzle.

In the accompanying drawings, one form of apparatus made according to the invention is illustrated:—

Fig. 3 is a sectional elevation to a larger scale of the lighting apparatus shown in Fig. 1;

Fig. 4 is a plan partly in section of the apparatus shown in Fig. 3;

Fig. 5 is a sectional elevation, also to a larger scale of a modified form of lighting apparatus.

Figure 1:
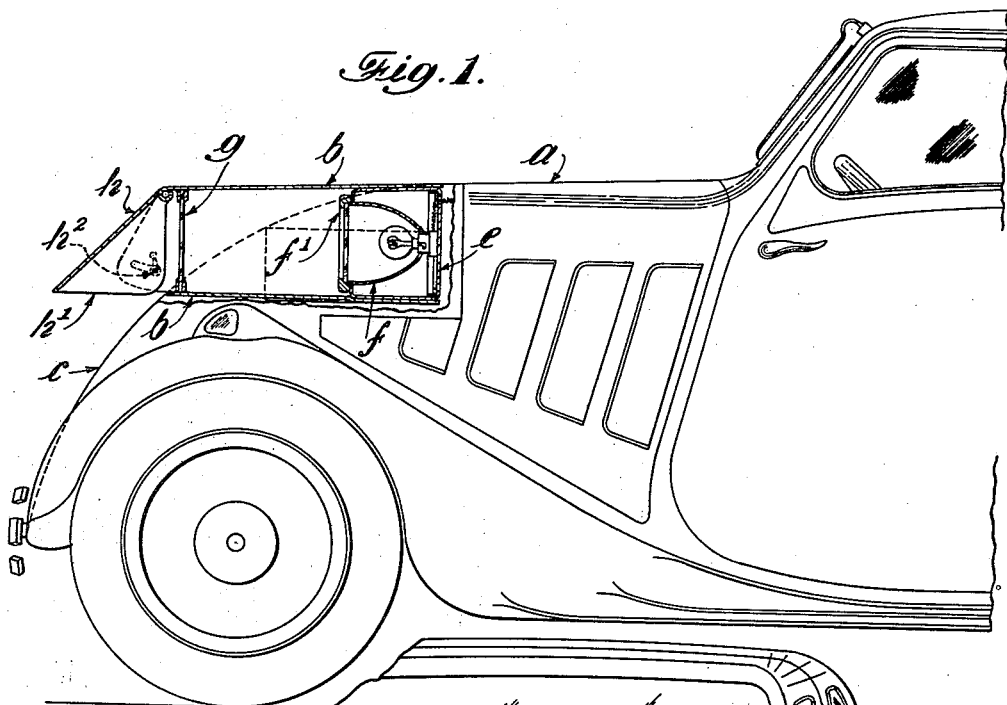
Fig. 1 is a side elevation of the front portion of the so-called streamlined motor car, the improved lighting apparatus being shown in section.
Figure 2:
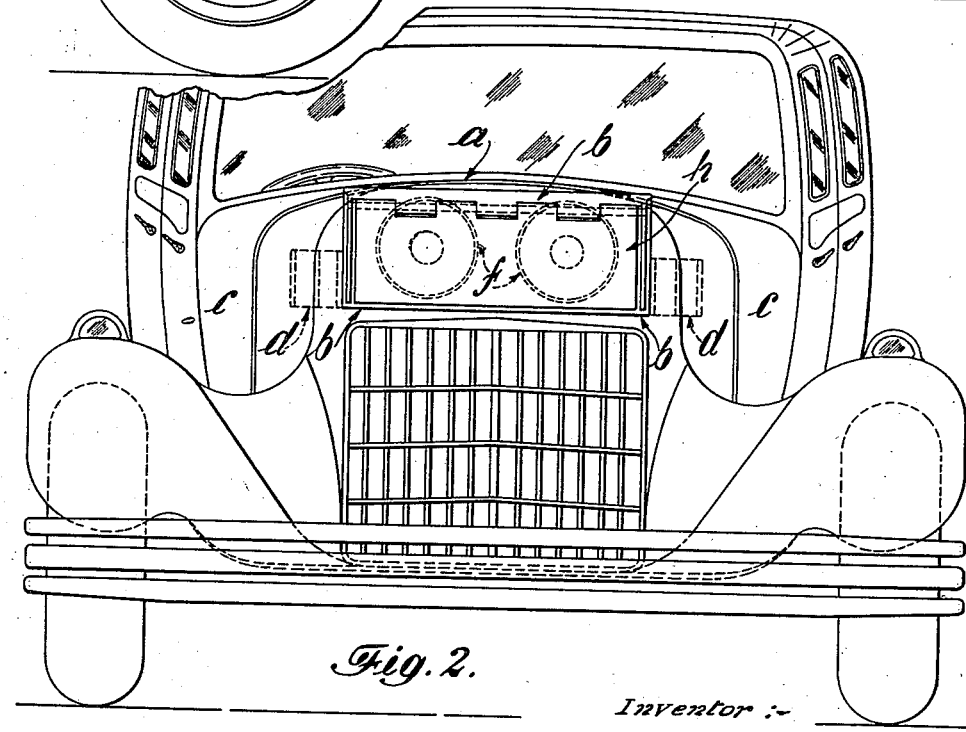
Fig. 2 is a front view of the same.

As shown, there is built into the bonnet $a$ of the car a housing $b$, the top of which is level with the top of the bonnet. Such housing, which is of slightly tapered section from back to front (see Figs. 1 and 3), is carried from the side walls $c$ of the bonnet by sheet metal members $d$, see Fig. 4, and has fitted into its rear end a smaller housing or box $e$ carrying two headlamps $f$. The box $e$ is held in position by ears $e^1$ fitting over screwed studs $d^1$ in the members $d$, and by the nuts $d^2$, compression springs $d^3$ being provided on the studs $d^1$. Any suitable type of headlamp may be used, that shown incorporating the screw-on front $f^1$.

At its front end, the housing $b$ is fitted with a glass panel $g$, and with a hinged cowl or shield $h$ having the side wings $h^1$. The cowl $h$ is hinged to the top of the housing $b$, the wings $h^1$ lying within the extended side walls of the housing, and the cowl is retained in the set position by the screws $h^2$ and nuts, a slot for the screw being made in the said side walls. As will be seen from Fig. 1, the front end of the housing $b$ projects forwardly from the bonnet, and the positioning screws $h^2$ are accessible outside the bonnet.

All the inner faces of the housing and the inner face of the cowl are highly polished, so as to reflect light. The light finds its exit through the opening between the bottom edge of the cowl and the front edge of the bottom of the housing $b$.

Referring to Fig. 5, there is no hinged cowl, but the housing $b$ is formed with an integral downwardly directed front wall, which constitutes a fixed cowl, and instead of the glass panel $g$ being placed over the horizontal floor of the housing, it is arranged in the mouth of the housing.

In all cases, the reflector, i. e., the cowl or shield, may be flat or convex or concave or may be flat at the upper part and convex at the lower part, but in all cases will be arranged so as to prevent a direct view of the headlamps by an oncoming person and to diffuse the intercepted light on to the roadway.

The lamps may in some cases be arranged nearer to the front of the car, and in some cases a further reflector or reflectors may be provided to direct the diffused light forwardly along the road surface. Also, instead of the lamps facing directly forward, as shown in the drawings, they may be tilted slightly so as to direct the light beam downwards.

Instead of two lamps, one only may be used, and the associated tube or tunnel, or housing, may enlarge in diameter as it approaches the front of the vehicle.

What I claim is:—

A lighting arrangement for motor vehicles comprising an open-ended housing located under the bonnet of the vehicle and secured to the bonnet by metal brackets, a box-like lamp container fitting into and filling the rear end of the said housing, head-lamps carried in the box-like container and directed towards the front end of the housing, and a cowl or shield inclined downwardly and forwardly from the front upper edge of the housing to a point below the lowest horizontal plane passing through the bulb in the head-lamp, and also comprising lugs on the box-like lamp container passing over screwed studs projecting rearwardly from the metal brackets which support the housing, compression springs on such screwed studs, nuts to screw the lugs against the springs to retain the lamp container in the housing, and a glass panel closing the front end of the housing, the housing being located with its forward end projecting forwardly of the bonnet, and the shield or cowl being hingedly connected to the front upper edge of the housing, and adjustable to set angular positions by means accessible outside the bonnet.

JOHN GIBSON STEEL.